No. 856,971. PATENTED JUNE 11, 1907.
W. H. MacDONALD.
CLUTCH.
APPLICATION FILED APR. 7, 1902.
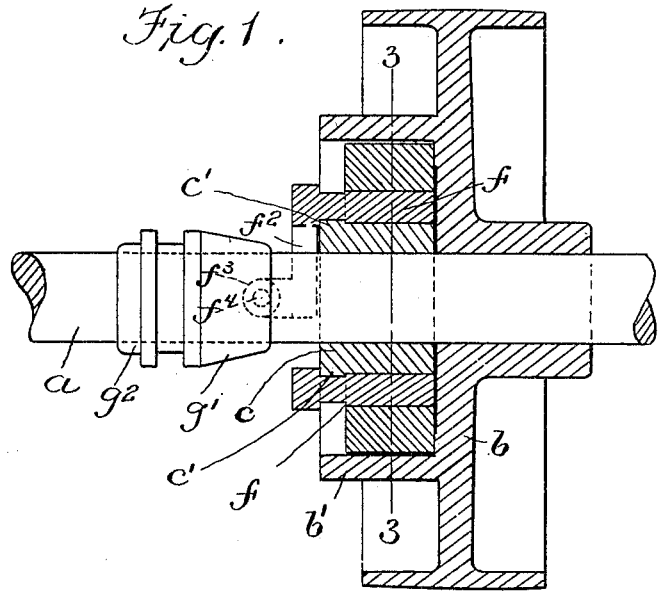
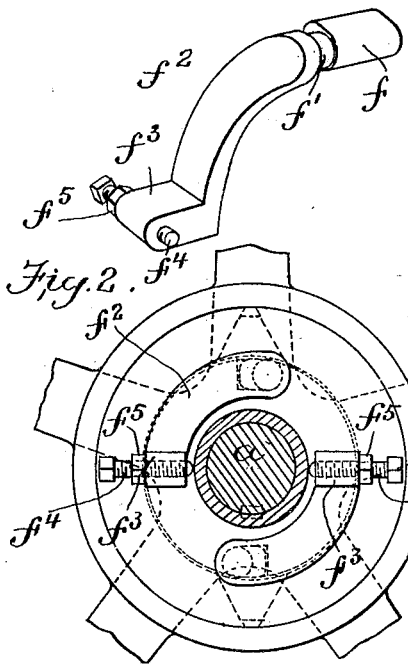
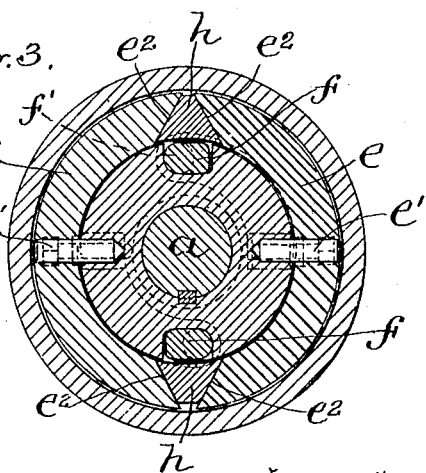
Witnesses.
H. L. Robbins
A. L. Folsom
Inventor
W. H. MacDonald

UNITED STATES PATENT OFFICE.

WILLIAM H. MacDONALD, OF BOSTON, MASSACHUSETTS, ASSIGNOR TO JAMES S. WILSON, OF CHELSEA, MASSACHUSETTS.

CLUTCH.

No. 856,971.  Specification of Letters Patent.  Patented June 11, 1907.

Application filed April 7, 1902. Serial No. 101,795.

*To all whom it may concern:*

Be it known that I, WILLIAM H. MACDONALD, of Boston, in the county of Suffolk and State of Massachusetts, have invented certain new and useful Improvements in Clutches, of which the following is a specification.

This invention has relation to clutches, and more particularly to the type wherein is employed an expansible ring with provisions whereby the same may be expanded or contracted to connect or disconnect two clutch members.

The invention consists in certain structural features which are set forth in the accompanying specification, illustrated upon the drawings and particularized in the appended claims.

Figure 1 represents in longitudinal vertical section a clutch embodying the invention. Fig. 2 represents an end elevation of the same, the sliding conical sleeve being shown in section. Fig. 3 represents a section on the line 3—3 of Fig. 1. Fig. 4 represents one of the oscillatory cam members for actuating one of the wedges to expand the ring.

On the drawing, $a$ indicates a shaft having loosely mounted thereon a pulley $b$ with an annular flange $b'$ which constitutes one of the clutch members. Keyed to the shaft there is a disk or wheel $c$ which constitutes the other of the clutch members. Interposed between the members $b$ and $c$, which are concentrically arranged one within the other as shown in Fig. 3, there is a split ring consisting of two sections $e$ $e$. The number of sections into which the ring is divided is immaterial, but for all general purposes I find that two sections will produce satisfactory results. Each ring section is held against axial movement by pins $e'$ which extend radially outward from the member $c$ through apertures in the ring sections. This construction permits the two sections to move toward and from each other bodily, and further enables the ends of the sections to spring outwardly in case said sections are formed of metal, which is more or less resilient, whereby there is secured a greater frictional engagement of the ring sections with the encircling clutch member $b'$. Either of the two members may be employed to drive the other, but, for the sake of simplicity in description, I refer to the member $b'$ as the "driving" member and to the member $c$ as the "driven" member. This language, however, is used for the purpose of description and not of limitation.

Under normal conditions, the driving member turns freely without engaging sections $e$ sufficiently to effect a rotation of the member $c$. In order, however, to frictionally connect the two members, the ring sections are beveled at their ends as indicated at $e^2$, and interposed between said beveled ends are wedges $h$ as illustrated in Fig. 3. By forcing the wedges $h$ radially outward between the ring section, the latter frictionally connect the member $c$ and the member $b'$. The means by which the wedges are moved radially outward comprise flattened rock-shafts $f$ placed between the wedges and the member $c$. Said rock shafts have peripheral grooves $f''$ for the peripheral flange $c'$ on the member $c$ whereby they are held against axial movement, said rock shafts being located in sockets in said member $c$. The rock shafts lie parallel to the axis of rotation of the clutch members, and on their outer ends are formed or secured arms $f^2$ by which said shafts may be rocked or partially rotated. On the end of each arm there is an off-set $f^3$, through which is passed a screw $f^4$ adapted to be held in any position to which it may be adjusted by a set nut $f^5$. The screws $f^4$ are substantially radial relatively to the shaft $a$ and they are adapted to be engaged by the conical end $g'$ of a sleeve or collar $g^2$ loosely sliding on the shaft $a$. This sleeve or collar is adapted to be moved by the usual yoke (not shown), its function being to engage the screws $f^4$ in the ends of the arms $f^2$ and swing the said arms outward so as to rock the shafts $f$ and force the wedges radially outward so as to spread the ends of the ring sections apart, whereby said ring sections frictionally engage the periphery of the split ring with the inner frictional surface of the member $b'$.

It will be evident that in lieu of the elements which I have described, I may employ mechanism equivalent therefor without departing from the spirit and scope of the invention.

Having thus explained the nature of the invention, and described a way of construction and using the same, although without attempting to set forth all of the forms in which it may be made, or all of the modes of its use, I declare that what I claim is:—

A clutch comprising two members, one of which encircles the other and of which one is provided with an annular flange, pins projecting radially from the inner clutch member, a plurality of ring-sections slidingly mounted on said pins and arranged between said members with their ends in proximity, shafts arranged parallel to the axis of rotation of said members, arms on the ends of said shafts adapted to be engaged by a sleeve and thrust outwardly to rock said shafts, cam-members on said shaft, and wedges adapted to be engaged by said cam-members whereby the rocking of said shafts separates said ring-sections and causes them to engage the outer clutch member.

In testimony whereof I have affixed my signature, in presence of two witnesses.

WILLIAM H. MacDONALD.

Witnesses:
  M. B. MAY,
  GEORGE PEZZETTI.